United States Patent [19]
Mroczka et al.

[11] Patent Number: 5,806,878
[45] Date of Patent: Sep. 15, 1998

[54] COLLAPSIBLE WHEELBARROW/STRETCHER

[75] Inventors: David E. Mroczka, Cromwell; Edward J. Mroczka, Portland, both of Conn.

[73] Assignee: Double D Development Co. L.L.C., Portland, Conn.

[21] Appl. No.: 713,673

[22] Filed: Sep. 17, 1996

[51] Int. Cl.[6] .............. B62B 1/20; B62C 1/06; B60B 1/04; B60B 21/06

[52] U.S. Cl. .............. 280/653; 280/655; 280/659; 280/47.31; 280/63; 301/32; 301/35.62; 301/64.1

[58] Field of Search .............. 280/659, 47.31, 280/655.1, 653, 645, 655, 47.26, 47.3, 47.315, 63; 301/8, 32, 63.1, 64.1

[56] References Cited

U.S. PATENT DOCUMENTS

| | | | |
|---|---|---|---|
| 1,163,257 | 12/1915 | Ottenad | 301/32 |
| 1,556,941 | 10/1925 | Liddell | 301/35.62 |
| 1,718,969 | 7/1929 | Lockwood | 206/304 |
| 1,846,117 | 2/1932 | Klaus . | |
| 1,862,415 | 6/1932 | Morgan | 301/32 |
| 2,348,084 | 5/1944 | MacChesney et al. | 206/46 |
| 2,494,199 | 1/1950 | Provitola et al. . | |
| 2,967,058 | 1/1961 | Hoffmann, Jr. . | |
| 3,214,011 | 10/1965 | Olson | 206/46 |
| 3,552,760 | 1/1971 | Sine . | |
| 3,722,904 | 3/1973 | Puckett . | |
| 3,746,399 | 7/1973 | Verdier | 301/65 |
| 3,826,511 | 7/1974 | Frank . | |
| 4,056,285 | 11/1977 | Wright . | |
| 4,418,736 | 12/1983 | Vandenburgh | 152/354 R |
| 4,465,321 | 8/1984 | Berg | 301/5 R |
| 4,602,823 | 7/1986 | Berg | 301/32 |
| 4,790,362 | 12/1988 | Price | 152/153 |
| 5,026,079 | 6/1991 | Donze et al. . | |
| 5,033,760 | 7/1991 | Evans | 280/47.26 |
| 5,040,807 | 8/1991 | Snover | 280/30 |
| 5,087,061 | 2/1992 | Wallace | 280/30 |
| 5,346,232 | 9/1994 | Bushon | 280/47.31 |
| 5,372,376 | 12/1994 | Pharaoh | 280/653 |
| 5,433,462 | 7/1995 | Groleau | 280/38 |

*Primary Examiner*—Robert J. Oberleitner
*Assistant Examiner*—Bridget Avery
*Attorney, Agent, or Firm*—Alix, Yale & Ristas, LLP

[57] ABSTRACT

A collapsible wheelbarrow has a wheel assembly. The wheel assembly has a collapsible rim and a tire mounted to the rim. The tire comprises a flexible woven fabric and an inner tube for expanding the tire. The wheel assembly rotatably mounts to an axle. A plurality of spaced apart handles extend from the axle and cargo are mounted between the handles for supporting cargo on the wheelbarrow.

16 Claims, 10 Drawing Sheets

COLLAPSIBLE WHEELBARROW/STRETCHER

BACKGROUND OF THE INVENTION

This invention relates to the field of wheelbarrows or stretchers for the movement of cargo. More specifically, the invention relates to a collapsible wheelbarrow or collapsible stretcher.

Wheelbarrows have long been used to move heavy or bulky materials by human propulsion. Conventional wheelbarrows have a single wheel rotatably mounted to a frame. The frame is typically formed in part by a pair of generally parallel handles adapted for human grasping. Mounted to the frame is a cargo supporting structure such as a bucket for the support of materials loaded on the wheelbarrow.

Conventional wheelbarrows are characterized by simple construction and ease of use.

One detriment of most conventional wheelbarrows is the large size and substantial weight. Due to the size and weight of the conventional wheelbarrow, the use of wheelbarrows has generally been restricted to construction or residential locations where the wheelbarrow can be stored close at hand for use.

To overcome at least some of these limitations, collapsible wheelbarrows have been constructed to reduce at least wheelbarrow size. Prior examples, however, have tended to be overly complex and difficult to collapse and reassemble. Furthermore, the size reduction, in many cases, is not particularly substantial. In addition, many prior attempts at designing a collapsible wheelbarrow have not effectively resulted in substantial reductions in wheelbarrow weight, or the reduction in weight has been at the expense of load carrying capacity.

Conventional stretchers are well known for the movement of immobilized persons. A detriment of conventional stretchers is that they often require two persons to move a single immobilized person. Wheeled gurneys can be employed by a single person to an immobilized person. However, conventional wheeled gurneys are typically unsuitable for rough terrain.

SUMMARY OF THE INVENTION

Briefly stated, a collapsible wheelbarrow in accordance with the invention has a collapsible wheel assembly and collapsible handles. The collapsible wheel assembly of the wheelbarrow preferably employs a collapsible fabric tire mounted to a wheel or rim that can be readily disassembled. The collapsible wheel assembly rotatably mounts to an axle assembly having ends extending axially beyond the wheel assembly. Detachably mounted at each end of the axle assembly is a collapsible handle. The handles extend generally orthogonally from the axle and parallel to each other. The handles preferably support a cargo net or other woven fabric therebetween. The wheelbarrow of the invention is preferably readily collapsible to a size that can be stowed in a conventional backpack. The collapsible wheelbarrow can also be employed as a collapsible stretcher.

The collapsible wheelbarrow of the invention is sufficiently light that it may be carried by a single person to remote locations for the movement of heavy loads therefrom. For example, hunters could readily carry the collapsible wheelbarrow of the invention in a conventional back pack during a hunting expedition. The wheelbarrow can be simply and quickly assembled preferably without tools at a remote location for the removal of large game to a more accessible location. The collapsible wheelbarrow of the invention can also be employed as a stretcher for military or emergency situations. For example, during military search and rescue operations, medics or other emergency personnel could load an injured person onto the assembled collapsible wheelbarrow or stretcher and move them to a location where medical attention could be more readily provided.

The wheel assembly of the invention is particularly well adapted for rolling over difficult and rough terrain. The preferable fabric tire of the wheel assembly is highly puncture-resistant, yet sufficiently flexible to avoid bogging down in soft or marshy ground.

An object of the invention is to provide a wheelbarrow that can be reduced in size for simplified transport.

Another object of the invention is to provide a wheelbarrow having a reduced weight for easier transportation of the wheelbarrow.

A further object of the invention is to provide a wheelbarrow that can be used over rough and difficult terrain.

A still further object of the invention is to provide a collapsible wheelbarrow that can be disassembled and reassembled at a remote location.

These and other objects of the invention will be apparent from review of the specification and drawings.

DETAILED DESCRIPTION OF THE PREFERRED EMBODIMENTS

Figure 1:
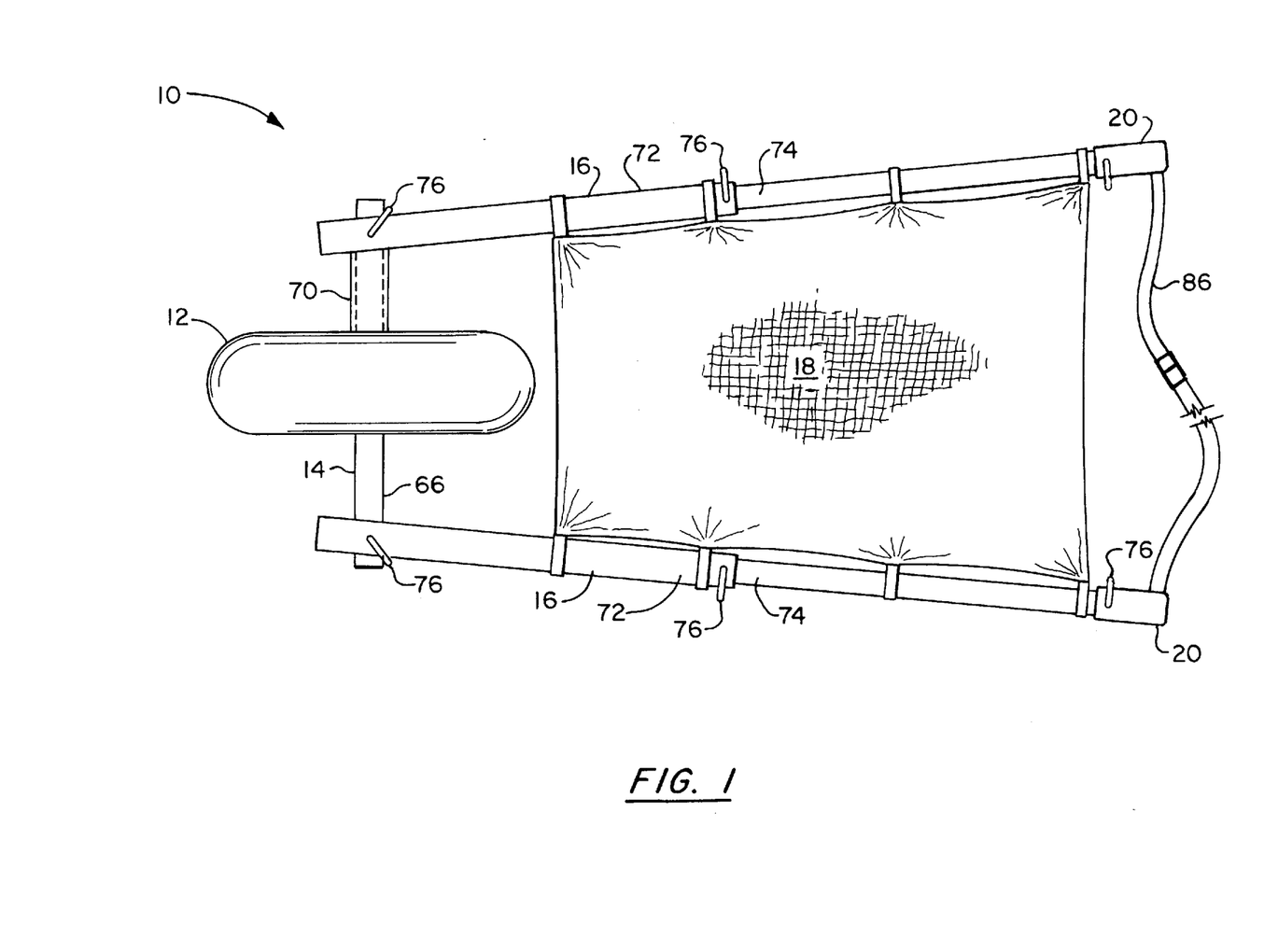
FIG. 1 is a top plan view of a collapsible wheelbarrow in accordance with the invention.
Figure 2:
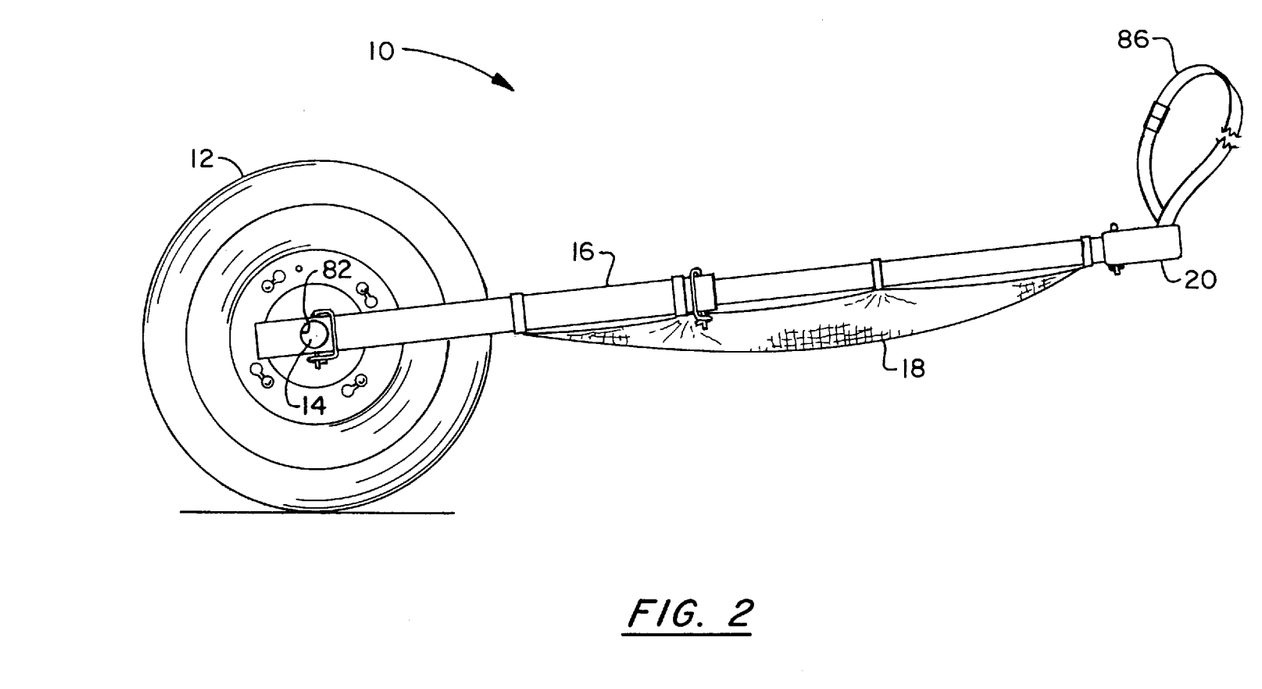
FIG. 2 is a side view of the collapsible wheelbarrow of FIG. 1.

With reference to the drawings, wherein like numerical identifiers represent like components throughout the figures, a collapsible wheelbarrow in accordance with the invention is generally designated by the numeral 10. The collapsible wheelbarrow 10 can be employed as a collapsible stretcher for the movement of injured persons. The collapsible wheelbarrow 10 has a wheel assembly 12 rotatably mounted to an axle assembly 14. (See FIGS. 1 and 2) Extending generally radially from the axle assembly 14 are a pair of generally parallel collapsible handles 16. Mounted between the handles 16 is a cargo support 18 for supporting cargo on the collapsible wheelbarrow 10.

The wheel assembly 12 has a collapsible rim 22 and a tire assembly 24. The collapsible rim 22 is formed of a pair of detachable mating first and second rim halves 26, 27. (See FIGS. 4 and 5) Each generally circular bowl-shaped rim half 26, 27 defines a center opening 28. Extending radially from the center openings 28 are reinforcing ribs 30. The first and second rim halves 26, 27 are constructed for releasible mating engagement. Each rim half 26, 27 has a radially extending engagement face 32. The engagement faces 32 are in oppositely positioned generally parallel relationship when the rim halves 26, 27 are engaged together. The rim halves 26, 27 can be constructed of carbon fiber or reinforced fiberglass, as well as metal or other well known suitable materials.

Figure 4:
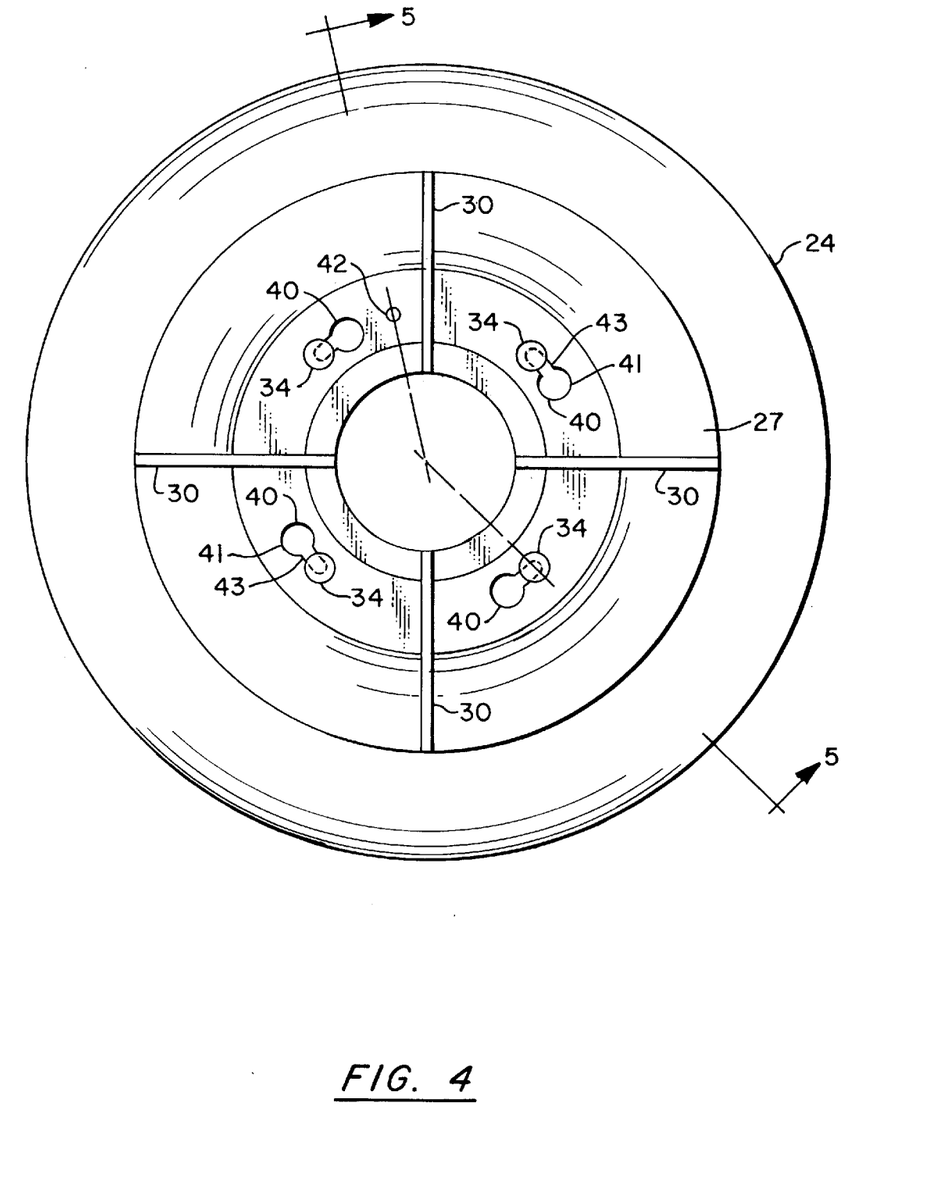
FIG. 4 is a side view of the collapsible wheel assembly of the collapsible wheelbarrow of FIG. 1.
Figure 5:
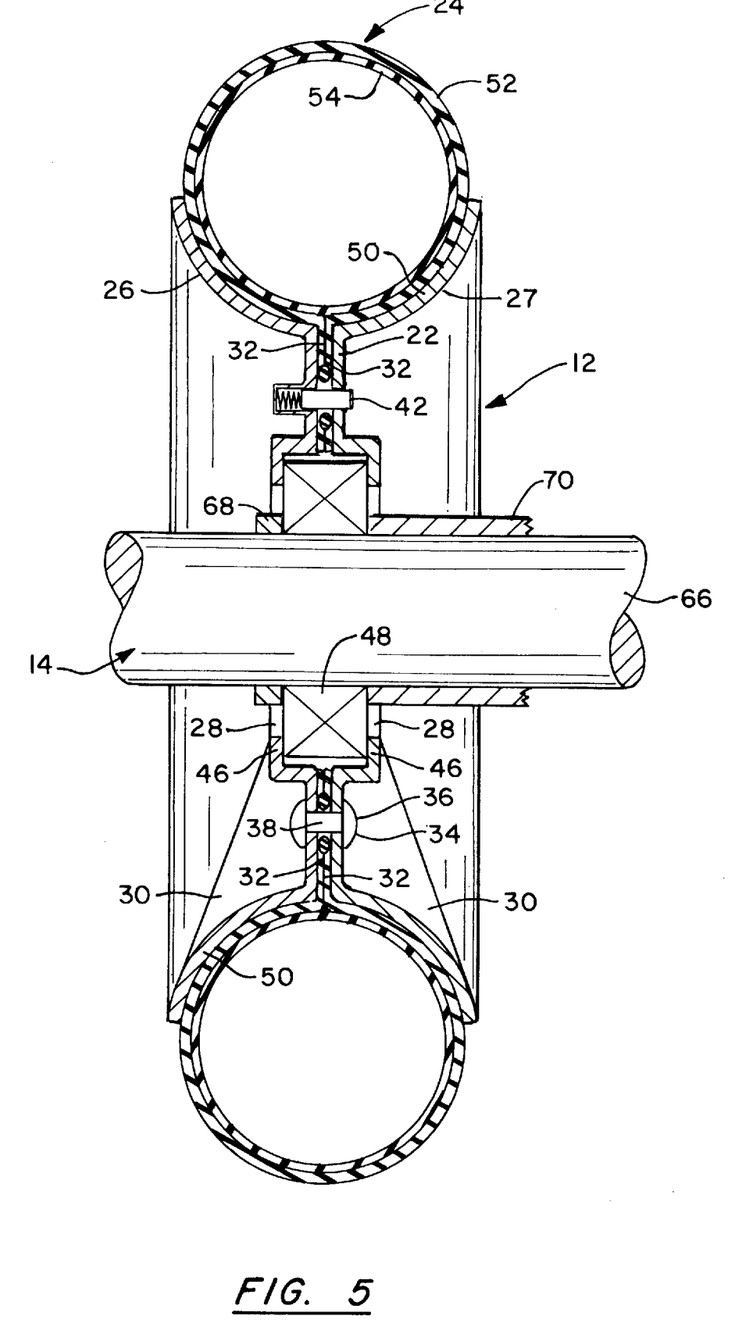
FIG. 5 is a cross-sectional view of the collapsible wheel assembly of FIG. 4 taken along the line 5—5.

Positioned generally concentrically with the center opening 28 on the first rim half 26 are axially extending engagement studs 34. The engagement studs 34 are fixed to the engagement face 32 of the first rim half 26 and have an expanded head portion 36 and reduced shank portion 38.

Arced keyhole shaped engagement slots 40 through the engagement face 32 of the second rim half 27 are oppositely positioned from the engagement studs 34. The engagement slots 40 have an enlarged portion 41 having a diameter greater than the diameter of the head portions 36 of the engagement studs 34, and a reduced portion 43 having a width less than the diameter of the head portions 36 of the engagement studs 34. The rim halves 26, 27 are positionable wherein the engagement studs 36 extend through the enlarged portions 41 of the engagement slots 40. Relative rotation between the rim halves 26, 27 slidingly engages the reduced shank portions 38 of the engagement studs 34 in the reduced portions 43 of the engagement slots 40.

A retaining pin 42 locks the rim halves 26, 27 in a fixed relative rotational position. (See FIG. 5) The retaining pin 42 is spring biased to project from the engagement face 32 of the first rim half 26. The retaining pin 42 extends through a retaining pin opening 44 in the second rim half 27 when the rim halves 26, 27 are fully engaged. The retaining pin opening 44 and retaining pin 42 are only in alignment when the shank portions 38 of the engagement studs 34 are fully seated in the reduced portions of the engagement slots 40. Each rim half 26, 27 further defines an annular bearing lip 46 coaxial with the center opening 28. The bearing lips 46 support a bearing 48 between the rim halves 26, 27. The bearing 48 can be permanently mounted to either of the rim halves 26, 27, or be a separate component captured between the rim halves 26, 27. The rim halves 26, 27 further define a generally U-shaped annular tire receiving channel 50 when engaged together. (See FIG. 5) Positioned within the tire receiving channel 50 is the tire assembly 24.

Figure 6:
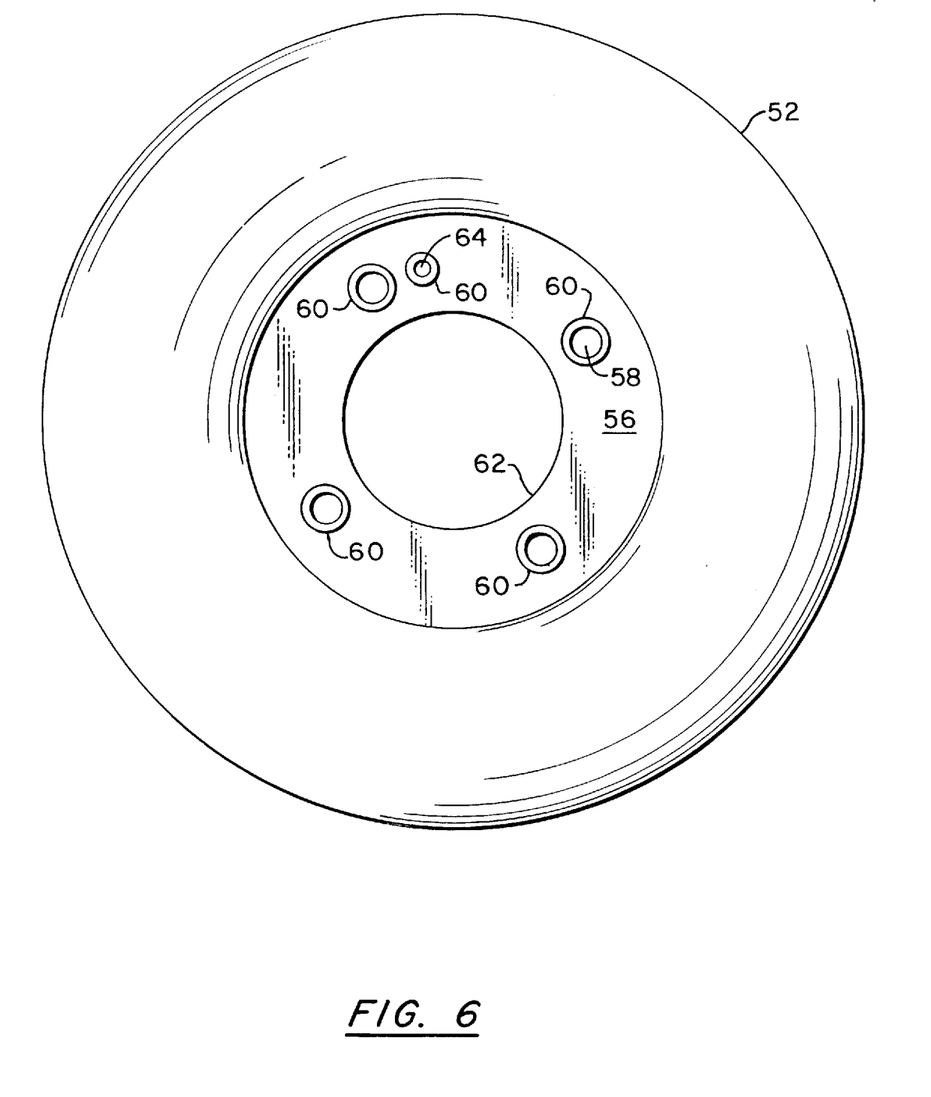
FIG. 6 is a side view of the collapsible tire of the collapsible wheel assembly of FIG. 4.

The tire assembly 24 has a flexible fabric cover or tire 52 and a conventional inflatable inner tube 54. The flexible fabric cover or tire 52 is preferably constructed of a tightly woven synthetic fiber such as an aromatic polyamide fiber of extremely high tensile strength for superior strength and puncture resistance. An example of such a material is KEVLAR™ marketed by Du Pont de Nemours, E.I. & Co. With reference to FIG. 6, the cover or tire 52 forms a generally toroid shape for close fitting engagement with the tire receiving channel 50 when the inner tube 54 is inflated. The fabric of the cover of tire 52 further extends radially inward to form a tire support flap 56. The tire support flap 56 defines a plurality of engagement stud openings 58 and a retaining pin opening 64. The openings 58, 62 in the tire support flap 56 are arranged for alignment with the engagement studs 34 and retaining pin 42 of the first rim half 26. Grommets 60 reinforce the openings 58, 62 in the tire support flap 56. The tire support flap 56 further defines a central opening 62 for passage of the axle assembly 14 therethrough.

During assembly of the collapsible wheel assembly 12, the deflated tire assembly 24 is positioned on the first rim half 26 with the engagement studs 34 extending through the engagement stud openings 58 of the tire support flap 56 of the tire 52. Furthermore, the retaining pin 42 extends through the retaining pin opening 64. The second rim half 27 is positioned for mating engagement with the first rim half 26 wherein the engagement studs extend through the enlarged portions 41 of the engagement slots 40. In this arrangement, the retaining pin 42 is forced inward by the engagement face 32 of the second rim half 27.

The rim halves 26, 27 are then rotated relative to each other until the retaining pin 42 engages the retaining pin opening 44. Finally the inner tube 54 is inflated through a valve to stiffen the tire 52. The inner tube 54 can be inflated by a small portable hand pump, a compressed gas cartridge or by any other well known means. The degree of inner tube inflation will be related to the terrain over which the wheelbarrow 10 will be conveyed. For example, the inner tube inflation is preferably relatively low for softer terrain.

To disengage the rim halves 26, 27, the retaining pin 42 is pushed out of the retaining pin opening 44 and the rim halves 26, 27 are rotated in the reverse direction relative to each other to disengage the engagement studs 34 from the engagement slots 40.

The collapsible wheel assembly 12 is preferably detachably mounted to the axle assembly 14. The axle assembly 14 has an axle 66 slidably extendable through the bearing 48. (See FIG. 5) The axle 66 and bearing 48 preferably form a tight sliding fit so the wheel assembly 12 does not wobble excessively on the axle assembly 14. A collar 68 extending radially from the axle 66 at one side of the wheel assembly 12 axially positions the wheel assembly 12 on the axle 66.

On the other side of the wheel assembly 12 from the collar 68, a sleeve 70 slidingly engages over the axle 66. The sleeve 70 extends from the bearing 48 to where one of the handles 16 detachably mounts to the axle assembly 14. (See FIGS. 1 and 5) The wheel assembly 12 is therefore axially captured between the collar 68 and the sleeve 70.

Alternately, the axle 14 can define a circular step 69 at approximately the midpoint of the length of the axle 66. (See FIG. 8) The step 69 in combination with the sleeve 70 prevents motion of the wheel assembly 12 axially along the axle assembly 14. In an alternate embodiment, the bearing 48 is permanently fixed to the axle 66 and the bearing 48 is captured between the engaged rim halves 26, 27.

Detachably mounted at each end of the axle assembly 14 is a handle 16. The handles 16 are collapsible to allow for easier stowage during transport of the wheelbarrow 10. The handles 16 are preferably telescoping, having a telescoping handle portion 74 for sliding engagement within a hollow handle portion 72. The handle portions 72, 74 are preferably constructed of a light weight material such as reinforced plastic or aluminum for reduced weight. Each handle 16 is maintained in the extended position by a D-shaped locking pin 76 extending through aligned openings in the hollow handle portions 72 and the telescoping handle portions 74. Locking pins 76 are preferably employed so no tools are required for assembly of the wheelbarrow 10 at a remote location. Additional telescoping handle portions can be provided to reduce the collapsed length of the handles 16, or to extend the handles 16 for use of the wheelbarrow 10 as a stretcher for transporting an immobile person. Therefore a single person can transport the immobile person without further assistance.

Alternately, a folding handle 16', having a hinge 78 at generally the midpoint of the handle can be employed in the collapsible wheelbarrow. A locking mechanism 80, such as a latch maintains the handle 16 in the unfolded or extended position.

The proximal ends of the handles 16 preferably form circular axle openings 82 for slidingly receiving the ends of the axle 66. The handles are mounted on the axle 66 by D-shaped locking pins extending through aligned openings in the handles 16 and the axle 66 of the axle assembly 14. The locking pins 76 required for assembly of the wheelbarrow 10 are preferably identical for simplified and rapid assembly of the wheelbarrow 10.

Alternately, the handle 16 can be mounted to the axle assembly 14 by ball and socket or spherical bearings 108. (See FIG. 10) Each spherical bearing 108 has a ball portion 110 and a socket portion 112. The socket portions 112 of the spherical bearings are permanently mounted at the proximal ends of the handles 16. The ball portions 1 10 are permanently mounted to the socket portions 112. A stud 114 extends from each ball portion 110 of the spherical bearings 108 for sliding engagement on the inside of a hollow axle 66. A D-shaped locking pin 76 extends through aligned openings in the axle 66 and studs 114 to maintain the studs 114 within the axle 66.

The cargo support 18 extends between the handles 16. The cargo support 18 is preferably a mesh or net material having a sufficiently small weave to prevent objects from falling through the cargo support 18. The cargo support 18 is mounted to the handles by fabric loops through which the handles 16 extend. Alternately, the cargo support 18 is laced through openings in the handle 16, affixed by hook and loop fabric fasteners, rivets or other well known fastening devices. The cargo support 18 can additionally provide shielding for an immobile person on the collapsible wheelbarrow 10 when the wheelbarrow is employed as a stretcher. The cargo support 18 is preferably formed of an aromatic polyamide fiber of extremely high strength such as KEVLAR™, marketed by Du Pont de Nemours, E.I. & Co, when used for shielding. The cargo support 18 can extend into a long flap (not shown) to cover and protect a person on the collapsible wheelbarrow 10 from further injury.

Hand grips 20 are preferably mounted to the distal ends of the handles 16. The hand grips 20 provide for improved manual grasping of the handles 16.

Figure 3:
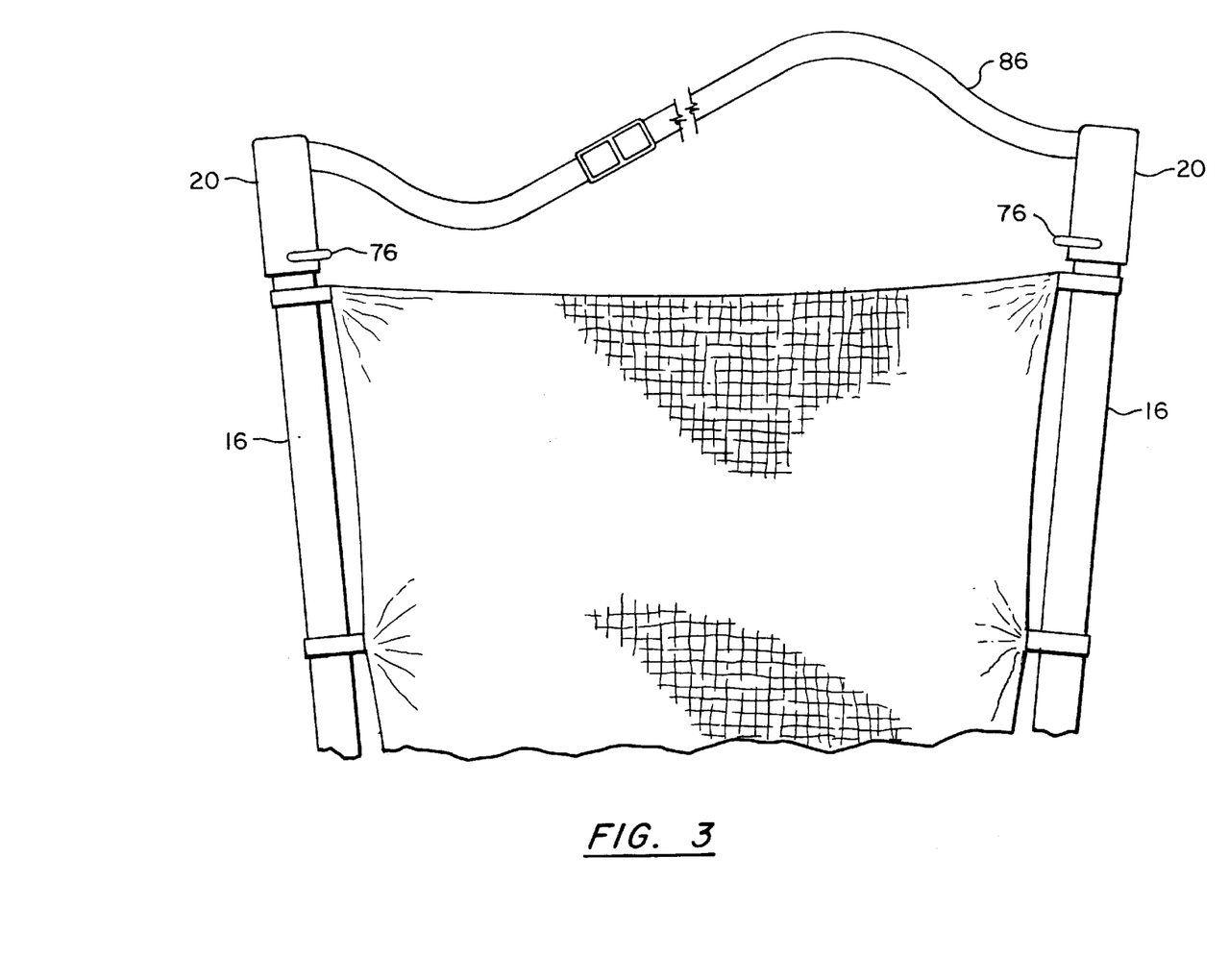
FIG. 3 is an enlarged top view, partly in phantom, of the handle portion of the wheelbarrow of FIG. 1.

In a preferred embodiment of the invention, a shoulder strap 86 mounts at the distal ends of the handles 16. (See FIGS. 1–3) The should strap 86 is an adjustable length strap that can be passed over the shoulders of the wheelbarrow user to assist in supporting the handle end of the wheelbarrow 10 above the ground. The shoulder strap 86 is preferably detachable mounted to the handle 16. In the preferred embodiment of the detachable shoulder strap 86, the hand grips 20 are detachably mountable to the distal ends of the handle 16. (See FIG. 3) Each end of the shoulder strap 86 is then permanently mounted to one of the hand grips 20. The hand grips 20 slidingly engage over the handles 16 and are fixed in position by D-shaped locking pins 76 extending through aligned openings in the hand grips 20 and the handles 16. The shoulder strap 86 when properly adjusted for length, allows hands free use of the collapsible wheelbarrow 10. In use, the shoulder strap 86 can be passed over the shoulders and around the back of the neck of the wheelbarrow user when the user faces away from the collapsible wheelbarrow 10. The wheelbarrow user can then more readily pull the collapsible wheelbarrow 10 over rough terrain without undue strain on the user's hands. The shoulder strap 86 can also be employed by the wheel barrow user when facing the wheelbarrow.

Figure 7:
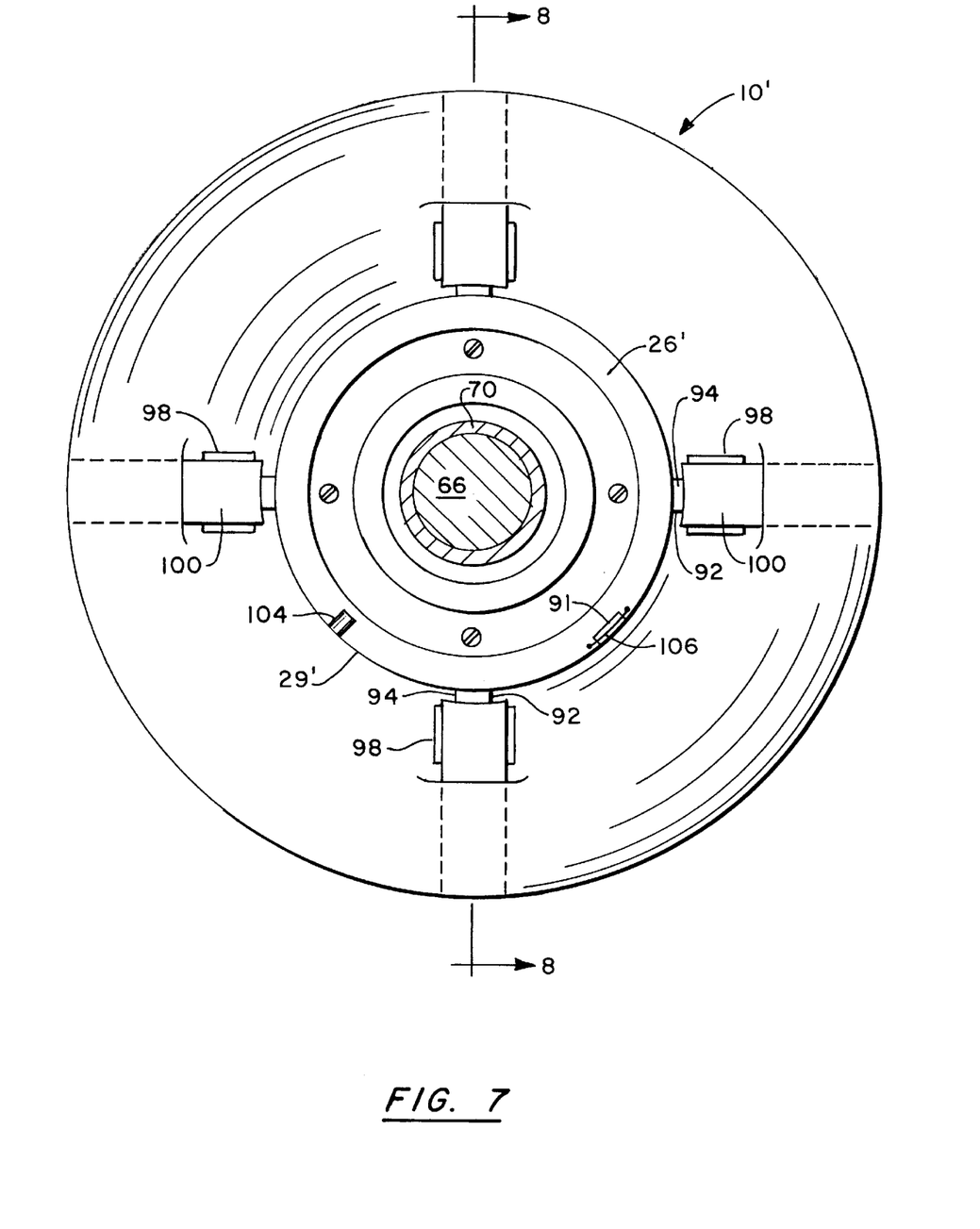
FIG. 7 is a side view, partly in phantom, of an alternate embodiment of the collapsible wheel on the collapsible wheelbarrow of FIG. 1.
Figure 8:
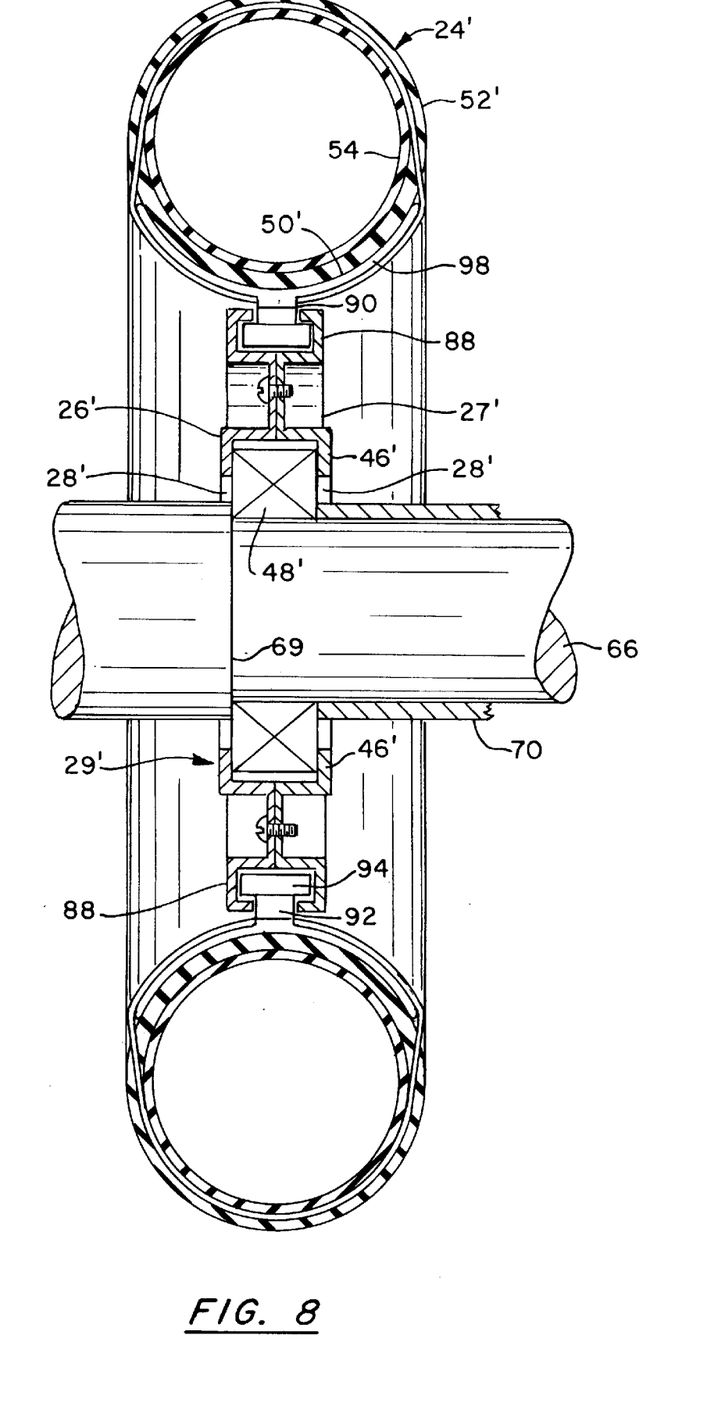
FIG. 8 is a cross-sectional view of the collapsible wheel of FIG. 7 taken along the line 8—8.

With reference to FIGS. 7 and 8, an alternate embodiment of the collapsible wheel assembly 12' can be used with the collapsible wheelbarrow 10. The collapsible wheel assembly 12' is formed of mating rim halves 26°, 27'. The rim halves 26', 27' are preferably permanently mounted together to form a hub assembly 29'. A bearing 48' is positioned at the center openings 28 of the first rim half 26' and the second rim half 27'. The bearing 48' is supported in position on the hub assembly 29' by the radially inward extending bearing lips 46' of the rim halves 26', 27'. The inner circumference of the bearing 48' slidingly engages the axle 66' of the axle assembly 14. The mated first rim and second rim halves 26', 27' define an annular spoke receiving channel 88 on the outer periphery of the hub assembly 29'. The spoke receiving channel 88 has a channel opening 90 oriented radially outward.

A plurality of spoke assemblies 92 are positionable within the spoke receiving channel 88. Each spoke assembly 92 has a stud or spoke 94 having an expanded head portion 96 slidingly engagable in the spoke receiving channel 88. Opposite the expanded head portion 96 is a yoke 98 threadably engaged to the spoke 94. Each yoke 98 defines a semi-circular tire receiving channel 50' for receiving a tire assembly 24'. The spoke assemblies 92 are equidistantly positioned around the rim halves 26', 27' with the expanded head portions 96 engaged in the spoke receiving channel 88 when the wheel assembly 12' is assembled.

The numbers of spoke assemblies 92 required is dependent on the size of the wheel assembly.

A tire assembly 24' is positioned in the tire receiving channels 50' of the spoke assemblies 92. The cover or tire 52' is preferably formed as an annulus of the previously identified flexible fabric. Positioned within the tire 52' is a conventional inflatable inner tube 54. A tire mounting band 100 on each spoke assembly 92 supports the tire assembly 12' in the tire receiving channels 50'. Each tire mounting band 100 extends around the outer periphery of each yoke 98. The tire mounting bands 100 continue through band openings 102 in the cover tire 52' and between the cover of tire 52' and the inner tube 54 to form a continuous band of material. The spoke 94 and lower portion of the yoke 98 of each spoke assembly 92 extends through an opening in the tire mounting band to maintain the tire mounting bands 100 on the spoke assemblies 92. The spoke assemblies 92 remain preferably mounted to the tire assembly 24' when the wheel assembly 12' is disassembled.

For assembly, the inner tube 54 is preferably pre-inflated through a nozzle 104. When the inner tube 54 is inflated, the spoke assemblies 92 will generally be oriented radially inward. The hub assembly 29' is then positioned generally inside the opening defined by the tire assembly 24'. The channel opening 90 has an enlarged portion 92 wherein the expanded head portions 96 of the spoke assemblies 92 can be inserted into the spoke receiving channel 88. The expanded head portion 96 of each spoke assembly 92 is in turn positioned in the spoke receiving channel 88 through the expanded opening 92 of the channel opening 90 as the hub assembly 29' is rotated. When all of the head portions 96 of the spoke assemblies 92 have been positioned in the spoke receiving channel 88, a retaining clip 106 is locked across the enlarged portion 92 of the channel opening 90 to prevent the spoke assemblies 92 from disengaging the spoke receiving channel 88. Alternately, the spoke assemblies 92 can be positioned in the spoke receiving channel 88 prior to inflation of the inner tube 54.

In further embodiments of the invention, collapsible wheelbarrow in accordance with the invention can be constructed with multiple collapsible wheel assemblies 12. The use of multiple wheel assemblies 12 provides for increased load capacity and increased stability of the collapsible wheelbarrow. In one multiple wheel collapsible wheelbarrow 10' in accordance with the invention, a plurality of wheel assemblies 12 are positioned between the handles 16. (See FIG. 10) The multiple wheel collapsible wheelbarrow 10' has an elongated axle assembly 14' for rotational mounting of the wheel assemblies 12. The axle assembly 14' has an elongated axle 66" for supporting a collar 68' and a first sleeve 70' and a second sleeve 70". The collar 68' is mounted off center on the axle 66'.

Figure 10:
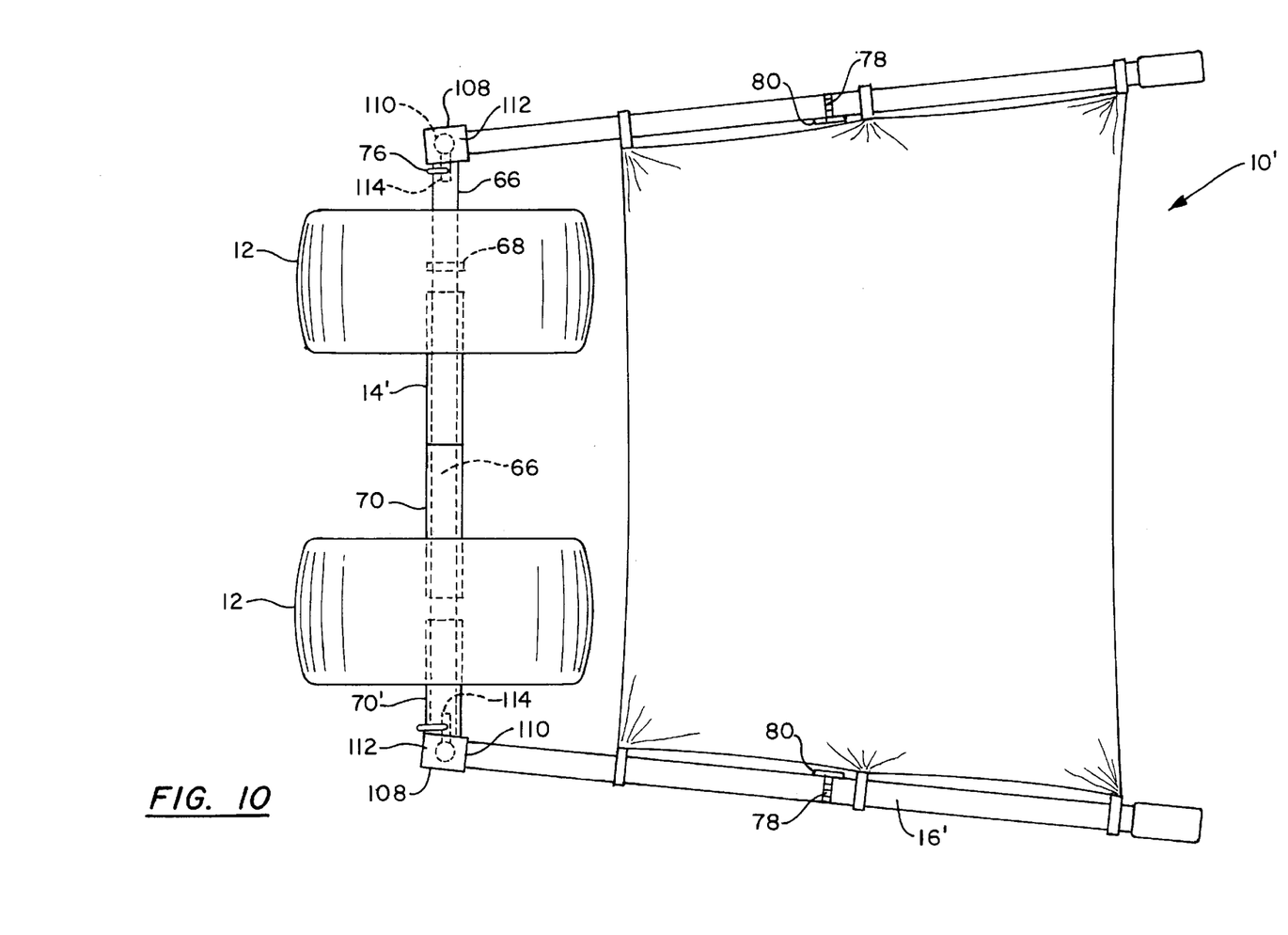
FIG. 10 is a top plan view, partly in phantom, of an alternate embodiment of a multiple wheel collapsible wheelbarrow of the invention.

During assembly, a wheel assembly 12 is slid onto the axle 66' until engaged against the collar 68'. The first sleeve 70' is then slid over the axle 66' and in contact with the wheel assembly 12. A second wheel assembly 12 is then slid onto the axle 66' and the second sleeve 70" is slid over the remaining portion of the axle 66'. The handles 16 can then be mounted to the axle assembly 14' as previously described.

Figure 9:
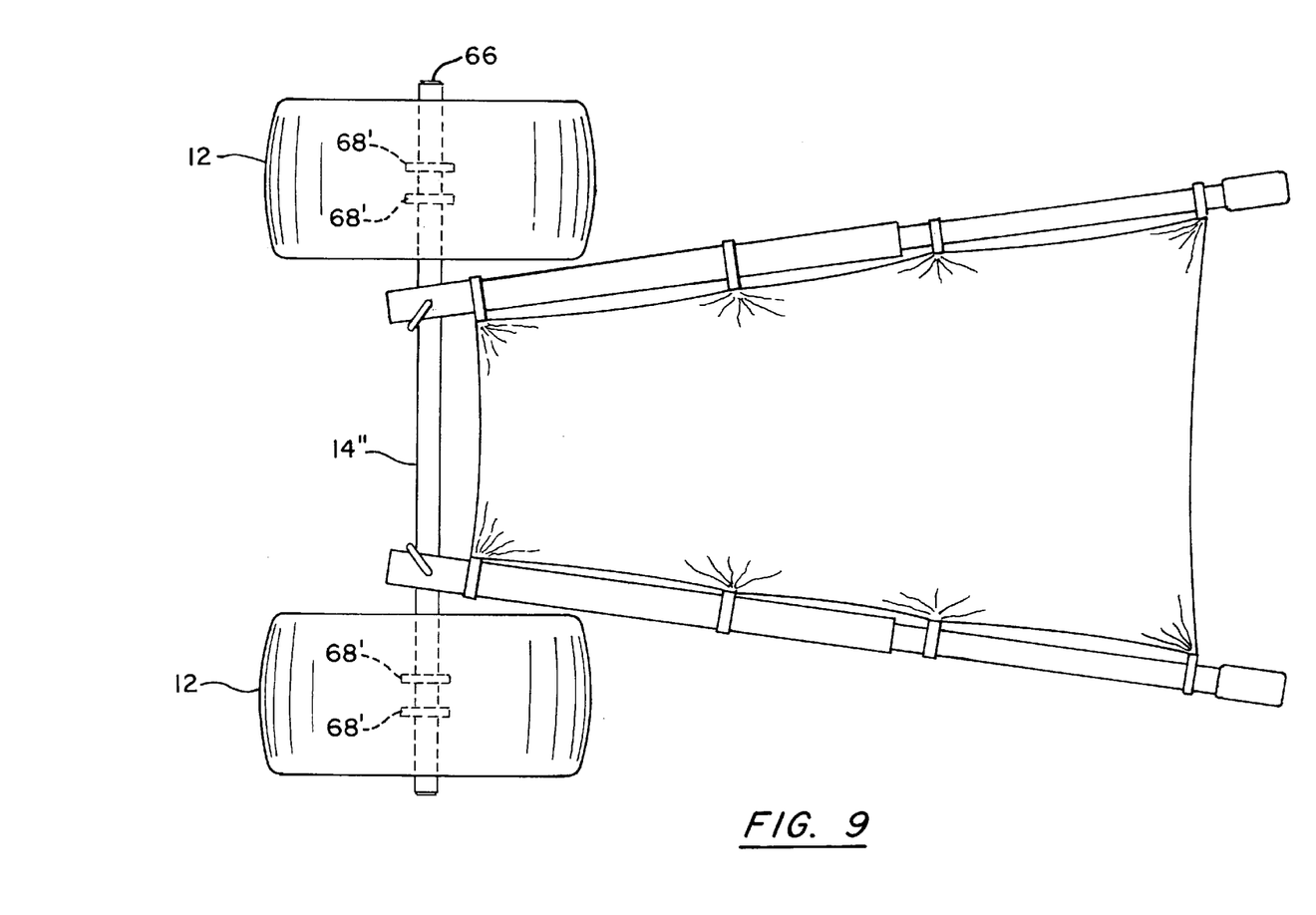
FIG. 9 is a top plan view, partly in phantom, of a multiple wheel collapsible wheelbarrow in accordance with the invention.

In yet another embodiment of the invention, (See FIG. 9) a multiple wheel collapsible wheelbarrow 10" in accordance with the invention has a plurality of wheel assemblies 12 positioned at the end portions of an axle assembly 14". The axle assembly 14" has an elongated axle 66" and detachable collars 68" selectively mountable to the axle 66". The handles 16 are first mounted to the central portion of the axle 66" as described above. One collar 68" is slid over an end of the axle 66" and secured to the axle 12 by a set screw in the collar 68'. A collapsible wheel assembly 12 is then slid onto the end of the axle 66" until engaged against the collar 68". Finally, an additional detachable collar 68" is positioned and fixed on the end of the axle 66" to maintain the collapsible wheel assembly 12 in position. The procedure is repeated at the other end of the axle 66" to mount another collapsible wheel assembly 12.

While preferred embodiments in accordance with the present invention has been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

What is claimed is:

1. A collapsible wheelbarrow comprising:

a collapsible wheel assembly comprising a collapsible rim transformable between collapsed and operative configurations having a rim center portion and detatchable spokes each having a yoke and extending radially from said rim center portion, and tire means mounted to said rim, said tire means comprising a flexible woven fabric cover and tube means for expanding said cover, said tire means mounted to said yokes;

an axle, said wheel assembly rotatably mounted to said axle;

a plurality of spaced apart handle means adapted for human grasping mounted to said axle, and extending from said axle; and cargo support means mounted to said handle means for supporting cargo on said wheelbarrow.

2. The collapsible wheelbarrow of claim 1 wherein said rim center portion defines an annular groove and said spokes have expanded head portions slidably engaged in said annular groove.

3. The collapsible wheelbarrow of claim 2 wherein each said spoke has a first end and a second end, said expanded head portion mounted at said first end and said second end defining said yoke.

4. The collapsible wheelbarrow of claim 1 wherein each said handle means comprises an elongated member having a first portion and a second portion, said first and second portions hingedly fixed together.

5. The collapsible wheelbarrow of claim 1 wherein said handle means comprises an elongated member having a first portion and a second portion, said first portion telescoping within said second portion.

6. The collapsible wheelbarrow of claim 1 wherein said cargo support means comprises a flexible net.

7. The collapsible wheelbarrow of claim 1 further comprising an elongated flexible strap having first and second ends, said ends fixed to said handle means.

8. A collapsible wheelbarrow comprising:

a collapsible wheel assembly having a collapsible rim transformable between collapsed and operative configurations comprising a pair of circular mating rim halves and means for engaging said rim halves to define an annular rim channel for receiving a tire assembly, and a tire assembly comprising a generally toroid-shaped flexible fabric cover generally defining an internal volume and tube means in said internal volume to expand said cover, said tire assembly positioned in said annular rim channel, said cover further defining an interior circumference and a flange of said flexible fabric extending from said cover at said interior circumference for positioning between said rim halves when said rim halves are engaged;

an axle, said wheel rotatably mounted to said axle;

handle means mounted to said axle defining a pair of handles; and cargo means mounted to said handles for supporting said cargo on said wheelbarrow.

9. The collapsible wheelbarrow of claim 8 wherein said engagement means comprises studs on one of said rim halves and keyhole slots defining an expanded portion and a reduced portion on the other of said rim halves, said studs positionable in said keyhole slots and said rim halves rotatable relative to each other to engage said studs in said reduced portion of said keyhole slots.

10. The collapsible wheelbarrow of claim 8 wherein said handle means telescope.

11. The collapsible wheelbarrow of claim 8 wherein said cargo means comprises a flexible net.

12. The collapsible wheelbarrow of claim 8 wherein said handle means are mounted to said axle by spherical bearings.

13. The collapsible wheelbarrow of claim 9 further comprising eyelets in said flexible flange defining stud passages and said studs passing through said stud passages when engaged in said keyhole slots.

14. A collapsible wheelbarrow comprising:

a collapsible wheel assembly having a collapsible rim assembly transformable between collapsed and operative configurations comprising a rim center portion defining an annular groove and detachable spokes having a first end engagable in said annular groove and a second end defining a tire support yoke, and a tire assembly mounted to said yokes comprising a generally toroid-type shaped flexible fabric cover generally defining an internal volume and tube means in said internal volume for expanding said cover;

an axle, said wheel rotatably mounted to said axle;

handle means mounted to said axle defining a pair of handles; and cargo means mounted to said handles for supporting cargo on said wheelbarrow.

15. The collapsible wheelbarrow of claim 14 wherein said cargo means comprises a flexible net.

16. The collapsible wheelbarrow of claim 14 wherein said handle means telescope.

* * * * *